(12) United States Patent
Reiter et al.

(10) Patent No.: US 6,405,313 B1
(45) Date of Patent: Jun. 11, 2002

(54) METHOD FOR PROVIDING AUTHENTICATION ASSURANCE IN A KEY-BINDING SYSTEM

(75) Inventors: Michael Kendrick Reiter, Raritan; Stuart Gerald Stubblebine, Lebanon, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/064,769

(22) Filed: Apr. 23, 1998

Related U.S. Application Data

(60) Provisional application No. 60/044,941, filed on Apr. 25, 1997.

(51) Int. Cl.[7] .............................. H04L 12/22; H04L 9/32
(52) U.S. Cl. ....................... 713/156; 713/201; 713/157; 709/238
(58) Field of Search .......................... 380/280; 713/175, 713/155–156, 170, 157, 775; 709/241, 209, 229, 201, 238

(56) References Cited

U.S. PATENT DOCUMENTS

| | | | |
|---|---|---|---|
| 5,073,934 A | * 12/1991 | Matyas et al. ................. | 380/30 |
| 5,699,431 A | * 12/1997 | Van Oorschot et al. ....... | 380/30 |
| 5,903,882 A | * 5/1999 | Asay et al. .................... | 705/44 |
| 5,933,503 A | * 8/1999 | Schell et al. ................. | 713/189 |

OTHER PUBLICATIONS

Sudia, Frank, et al., "Commercialization of Dual Signatures", pp. 1–16, (1993).
Garfinkel, Simson, "PGP: Pretty Good Privacy", Mar. 1995, pp. 13–14.*
T. Beth, M. Borcherding, and B. Klein. "Valuation of Trust in Open Networks", In D. Gollman, ed., Computer Security—ESORICS '94 (Lecture Notes in Computer Science 875), pp. 3–18, Springer–Verlag, 1994.*
L. R. Ford, Jr. and D. R. Fulkerson. "Maximal Flow through a network", Canadian Journal of Mathematics 8:399–404, 1956.*
U. Maurer. "Modeling a public–key infrastructure", In E. Bertino, H. Kurth, G. Martella, and D. Montolivo, ed., Computer Security—ESORICS '96 (Lecture Notes in Computer Science 1146), Springer–Verlag, 1996.*

(List continued on next page.)

Primary Examiner—Gilberto Barrón, Jr.
(74) Attorney, Agent, or Firm—Kenyon & Kenyon

(57) ABSTRACT

A name-to-target binding system generates certificates for use in authenticating a target key. In the system the certificate includes a first key. At least one attribute is assigned to the first key. A liability value is assigned to the combination of the first key and the at least one attribute. The system includes a second key used to sign a combination of the first key, the at least one attribute and the liability value wherein the second key is associated with the insurer agreeing to be liable for the liability value.

4 Claims, 5 Drawing Sheets

OTHER PUBLICATIONS

M. K. Reiter and S. G. Stubblebine. "Path independence for authentication in large–scale systems", In Proceedings of the 4th ACM Conference on Computer and Communications Security, Apr. 1997.

A. Tarah and C. Huitema. "Associating metrics to certification paths", In Computer Security—ESORICS '92 (Lecture Notes in Computer Science 648), pp. 175–189, Springer Verlag, 1992.

M. K. Reiter and S. G. Stubblebine. "Toward Acceptable Metrics of Authentication", In Proceedings of the 1997 IEEE Symposium on Security and Privacy, May 1997.

"Companies Need Certificate Interoperability: Certificate Authorities Positioning To Instill Peace of Mind", Electronic Commerce News vol: 2 Issue: 13, Mar. 31, 1997.

Draft Oregon Administrate Rules. Registration of Authentication Authorities. Dec. 1997.*

McAndrews, James J. Making payments on the Internet. Business Review—Federal Reserve Bank of Philadelphia; Philadelphia. Jan./Feb. 1997.*

Lai et al. Endorsements, Licensing, and Insurance for Distributed System Services. Presented at MIT Workshop on Internet Economics Mar. 1995.*

The State of Utah in Senate Bill 188 Digital Signature Act Amendments. Mar. 1996. pp. 1–34.*

ITU–T Recommendation X.509. Information Technology—Open Systems Interconnection—The Directory: Authentication Framework. Nov. 1993.*

* cited by examiner

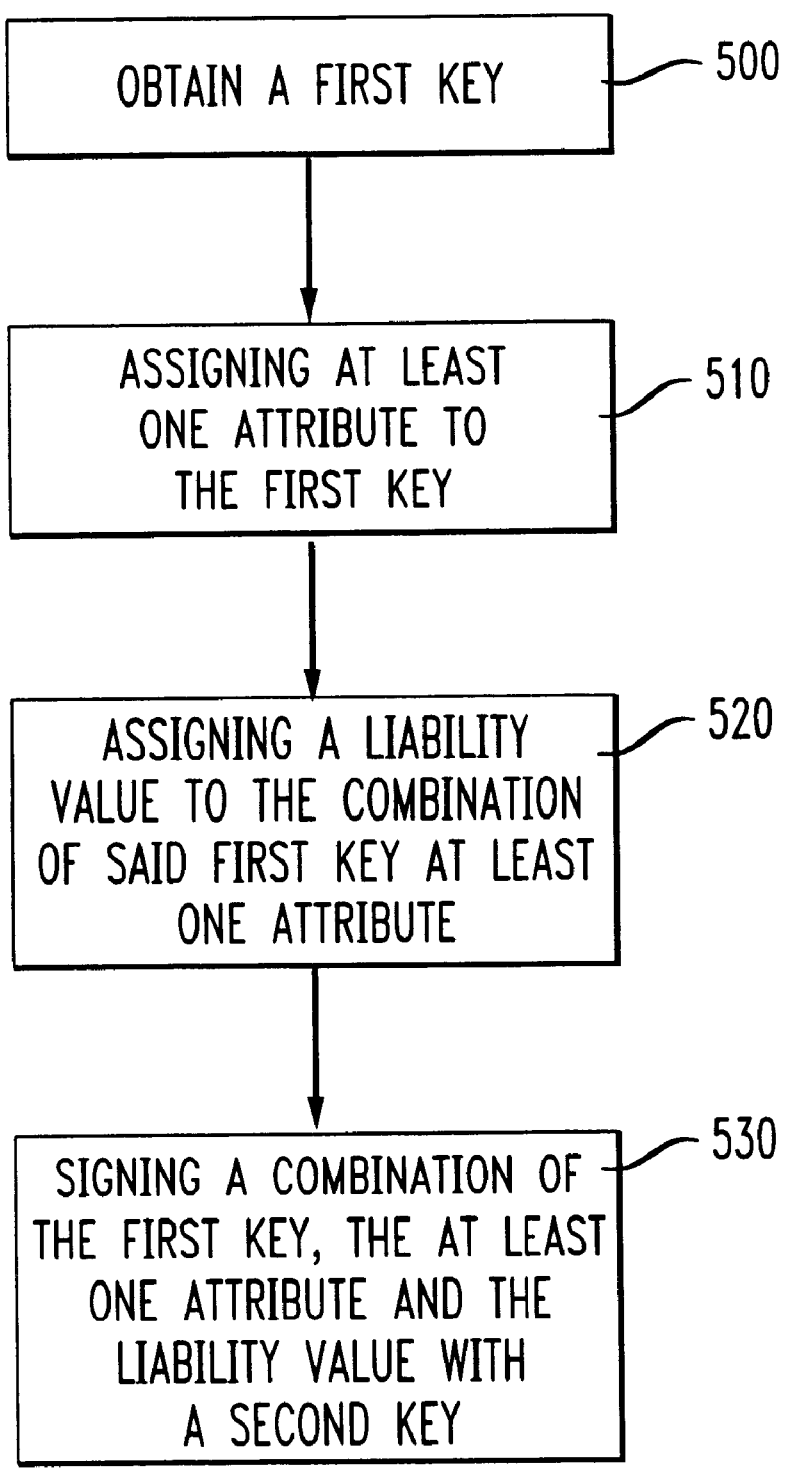

METHOD FOR PROVIDING AUTHENTICATION ASSURANCE IN A KEY-BINDING SYSTEM

RELATED APPLICATION

The present application claims the benefit of provisional application, number 60/044,941 filed Apr. 25, 1997 and entitled "Toward Acceptable Metrics of Authentication."

FIELD OF THE INVENTION

The present invention is directed to a method of providing authentication assurance in a keybinding system. More particularly, the present invention is directed to a method in which edges along a path between a source key and a target key have a level of assurance attributed thereto which can be used to assist a user in selecting among a plurality of available paths.

BACKGROUND

With the growth of electronic transactions over open networks, it has been desirable to explore the possibility of conducting electronic commerce over those networks. Such commerce typically requires certain levels of confidentiality to assure users that critical information which may be necessary to conduct a transaction is only used by the parties to the transaction in question and not other parties who might otherwise make improper use of the information. Mindful of this desire to maintain confidences many systems have employed encryption techniques for rendering the confidential information largely indecipherable in the absence of a key associated with the encryption technique.

Once it is determined to utilize encryption with respect to transactions, the next issue arises concerning how to either permit or limit access to the key information. Determining the owner of a public key, or conversely determining the public key for a user, appears to be a basic ingredient for executing transactions securely in any large scale open system. Due to the lack of a single authority for providing this information in a system having many different administrative domains, many systems resort to authentication by a path or chain of authorities. In accordance with such a model a user locates a path or sequence of authorities such that: 1) the user can authenticate the first authority in the path; 2) each authority in the path can authenticate the next authority in the path; and 3) the last authority in the path is in fact the targeted person or key of interest. If the user trusts every authority on the path, then perhaps it can believe that a proper name-to-key binding has been obtained.

A path of authorities may be weak because it relics on the correctness of every authority in the path. If any authority in the path incorrectly authenticates the next authority, then the user can be misled regarding the authentication of subsequent authorities in the path, including the target. A natural approach to increasing assurance in the authentication of the target would be to use multiple paths. Multiple paths have been shown to be useful in systems where the lack of an enforced certification structure naturally leads to the existence of multiple paths. Multiple paths may also arise in hierarchical certification structures as soon as cross certification is allowed.

An example of multiple paths from a trusted source key to a target key is shown in FIG. 1. In a hierarchical certification structure, child-to-parent and cross certification can be performed. Each of the nodes, 101 to 109, denotes a public key. A line between public keys denotes a certificate that contains the key to which that edge points and which can be verified with the key from which that edge originates. While the notion of obtaining redundant confirmation of the target name-to-key binding via multiple paths may be appealing the assurance provided by these paths may be unclear, especially if they have authorities in common or authorities that act in a correlated way. When combined with ambiguities in the assertions that authorities make and the ambiguities regarding who is actually making the assertions it may be difficult to complete the authentication with any confidence.

Several researchers have thus proposed metrics for measuring an assurance provided by a set of paths. For example. a metric might take as input other such paths of authorities and return a numeric value, where a higher value indicates greater confidence in the name-to-public-key binding (for the target name or public key) that those paths support. Various metrics use certificates for authentication.

One such certificate scheme is Recommendation X.509, International Telegraph and Telephone Consultative Committee (CCITT). X.509 deals with Authentication Frameworks for Directories. Within X.509 is a specification for a certificate which binds an entity's distinguished name to its public key through the use of a digital signature. For a further understanding of the environment in which the present invention may be implemented additional description of alternative metrics and their shortcomings will now be provided. Each metric below is described only to the extent necessary to set the stage for the rest of the description of the invention and some will be described in less detail than others. Furthermore, each of the metrics described below operates in the context of a model that consists of a directed graph whose nodes and edges are labeled in various ways. No two metrics share the same model. that is the same graph. Except where explicitly stated otherwise, the review of the performance of each metric is based on a model containing only consistent information, that is, where there are no conflicting reports regarding the owner (or other attributes) of a key. While how a metric behaves on conflicting information is important, this information is omitted to simplify the discussion. For purposes of the discussion an entity is something that possesses and makes use of a private/public key pair, for example a person, an authentication server, or certification authority. The user is the person applying the metric for the purpose of gaining assurance in a name-to-key binding.

The three main areas in evaluating a metric are the meaning of the values output by the metrics, the sensitivity of the metric (the extent of which the metric outputs can be manipulated by malicious behavior. e.g., compromise of cryptographic keys) and the effectiveness of using the metrics in a practice environment.

The most basic desideratum of a metric is that its output be meaningful. The metrics discussed below strive for this, although some achieve it better than others.

The metrics used for comparison in the present application are the Beth. Borcherding, and Klein metric, the Zimmermann metric, the Maurer metric, and the Reiter-Stubblebine metric. Each of these metrics, as described below, operates using a directed graph. The graph consists of nodes and edges as shown in FIG. 1.

Beth-Borcherding-Klein

The Beth-Borcherding-Klein metric takes as an input a set of trust relationships that can be represented by a directed graph. The nodes of the graph are entities. There are two types of edges in this graph. The first type is a "direct edge".

The direct edge A→B means that A believes it can authenticate (i.e., has the public key for) B. The second type of edge is a "recommendation edge"; the recommendation A→B represents that A trusts B to authenticate other entities or to recommend other entities to authenticate or further recommend. Associated with each recommendation and direct edge is a value in the range [0, 1]. In the case of a direct edge A→B, this value is A's estimation of the probability that A really holds the correct public key for B. The value on a recommendation edge A→B represents the degree of A's trust in B as a recommender, where higher values indicate stronger trust.

Given a specific query, say user A wanting the public key for entity B, the metric computes a value in the range [0, 1], using all paths from A to B whose last edge is direct and whose other edges are recommendation edges, such as A→C→D→B.

The Beth-Borcherding-Klein metric, however, suffers from a number of deficiencies. First, evaluating this metric requires the user to collect values from other entities for the various direct and recommendation edges. Before the user can safely assign a value to the edge A→B or A→B, the user must authenticate this value as having come from A. Assuming that this authentication is performed cryptographically (e.g., via a certificate), again the user is asked to determine a key that can be used to authenticate A in order to form the model for the query she wants answered. Thus, the user is forced to infer a binding between a key and its owner. This can be disadvantageous.

Additionally, the Beth-Borcherding-Klein metric is overly sensitive to misbehavior by one of the entities. In fact, this metric has the property that a single misbehaving entity can increase or decrease the result of the metric arbitrarily.

To show this, recall that the specific rules used to compute the Beth-Borcherding-Klein metric include that each edge in the Beth-Borcherding-Klein model is labeled with a value in the range [0,1]. Suppose that A wants to authenticate (determine the public key for) B. Beth, et al., propose and justify the following rules for computing an aggregate "score" for A's authentication of B based upon the values on the edges of the paths connecting A to B.

1. If there is a path A→...→C with recommendation value $v_1$, and a recommendation edge C→D with value $v_2$, then the path A→...→C→D has recommendation value $v_1 \cdot v_2$.
2. If there is a path A→...→C with recommendation value $v_1$ and a direct edge C→B with value $v_2$, then the path A→...→C→B has direct trust value $1-(1-v_2)^{v_1}$.
3. If for each $1 \leq i \leq m$, there are $n_i$ distinct paths from A to B ending with the edge $C_i$→B, with direct trust values $v_{i,1} \ldots, v_{i,n_i}$, then the combined direct trust value is $$V_{com}(A, B) = 1 - \prod_{i=1}^{m} \sqrt[n_i]{\prod_{n_i}^{j} = 1(1 - v_{i,j})}$$

To see an example of applying these rules, consider the graph of FIG. 2. By rules 1 and 2 above, paths A→C→F→B, A→D→G→B, and A→E→G→B yield direct trust values of 0.204, 0.173, and 0.765, respectively. Combining these with rule 3, we get $v_{com}(A,B)=0.649$.

Now consider the graph of FIG. 3, which is a manipulation of the graph in FIG. 2 caused by D's misbehavior. Here, D has created additional artificial paths from A to B through other nodes H, I, J that D "invented" for the purposes of altering the metric output. The trust value assigned to path A→D→H→B by rules 1 and 2 above is 0.821, and similarly for A→D→I→B and A→D→J→B. Rule 3 then yields a combined trust value of $v_{com}(A,B)=0.998$. What this example shows is that a single misbehaving node, by manipulating the graph used in the computation of the Beth-Borcherding-Klein metric, can drive the metric arbitrarily close to any value it chooses, and in particular to a high value that inflates the confidence expressed by the metric. Thus, in the face of malicious entities, it is unclear that Beth-Borcherding-Klein is a useful metric.

We should note that Beth-Borcherding-Klein allows for the exclusion of paths based on "constraint sets", and thus a user that is familiar with the graph structure could, e.g., explicitly exclude paths through H, I, and J. If the user is not familiar with what the graph structure should be, however, then the user might have no basis to exclude such paths.

Finally, the Beth-Borcherding-Klein metric is unable to be computed efficiently and additional edges added to its model can increase or decrease the metric output by an arbitrary amount. Therefore. the metric's output on partial information may give the user little insight into the "actual" quality of the name-to-key binding.

Maurer

The Maurer metric takes a directed graph as an input, as well. As in Beth-Borcherding-Klein, the nodes of this graph are entities and there are two types of edges, "direct" and "recommendation". However, the semantics of these edges are subtlety different in the Maurer model, in that these edges represent syntactic constructs, e.g., certificates. A direct edge A→B means that the user evaluating the metric "holds a certificate for B's public key (allegedly) issued and signed by entity A". Similarly, a recommendation edge A→B denotes that the user is in possession of a recommendation (for recommending or authenticating other entities) for B allegedly signed by entity A. Associated with each recommendation and direct edge is a value in the range [0, 1], called a confidence parameter, that is assigned by the entity that created (the construct represented by) the edge. Given a specific query, e.g., user A wanting the public key for B. the metric computes a confidence value in the range [0, 1] for the key that the model suggests is B's using the confidence parameters specified for the edges as probabilities.

The Maurer metric also has several shortcomings. Like the Beth et al. metric, Maurer forces a user to infer a binding between a key and its owner. In Maurer, the edge A→B exists in the model if the user evaluating the metric "holds a certificate for B's public key (allegedly) issued and signed by entity A". Maurer uses the word "allegedly" because "without verification, there exists no evidence that the certificate was indeed issued by the claimed entity." Put another way, when the entity that allegedly signed the certificate is claimed with the certificate, this claim is at best a hint and at worst an opportunity to be misled. It is presumably for this reason, however, that in some systems a certificate includes no claim at all of the entity that signed it, but rather only a claim of the key that signed it. For example, in some other metrics the certificate indicates only an identifier for the public key that can be used to verify the signature on the certificate. In such cases. how a certificate should be represented in the Maurer model is ambiguous, and presumably the user must infer the certificate's signer from other certificates for the key that verifies the certificate's signature. One interpretation even allows a certificate to be represented by multiple edges if different certificates indicate different owners for its verification key.

Additionally, in Maurer the meaning of the model's parameters can be ambiguous. Specifically, the policy that dictates how confidence parameters are assigned to certificates and recommendations is left unspecified. This raises two concerns. First, Maurer's interpretation of these confidence parameters as probabilities is not sufficiently justified. Indeed, the suggested means for determining confidence parameters (e.g., "speaker identification over a telephone line should be assigned a confidence parameter of at most 0.95") seem to bear no relationship to random experiments. Second. since the user evaluating the metric presumably must adopt the confidence parameters for certificates and recommendations determined by their creators, any ambiguities in the semantics of these parameters can be compounded by misinterpretation by the user.

Maurer also falls to provide an output that is intuitive, that is, it is difficult to write down a straight-forward natural language sentence to describe the meaning of the output. This metric computes a confidence value for a name-to-key binding as the probability that the binding can be derived from the initial view of the user where the random event is the selection of the initial view, i.e. the selection of a random subset of the certificates and recommendations available to the user, using a distributed defined by the confidence parameters assigned to edges. As this experiment does not correspond to a familiar procedure in the real world, it remains to be seen whether the average user is willing to understand and believe a metric computed in this way.

Maurer also is susceptible to manipulation via misbehavior. Maurer fails to be explicit about how sensitive a score is that it returns. The score returned by the Maurer metric can range from being very sensitive (e.g., if it is computed using only a single path from the source to the target) to very tolerant (e.g., if many disjoint paths are involved).

Finally, the Maurer metric cannot be computed efficiently.
Reiter-Stubblebine.

Reiter and Stubblebine developed two related metrics. The Reiter-Stubblebine metrics take a directed graph as an input, but this graph differs from those for the Beth-Borcherding-Klein and Maurer metrics. In this case, the nodes of the graph are public keys (actual keys, with no references to any entities), and an edge $K_1 \rightarrow K_2$ means that the user evaluating the metric has a certificate signed by the private key corresponding to $K_1$ (i.e., $K_1$ can be used to verify the signature) and that assigns attributes to $K_2$. The attributes bound to $K_2$'s owner (among other things, perhaps), are included as a label on the edge $K_1 \rightarrow K_2$. There are no other values associated with edges or nodes.

Each metric takes as an input the above graph, a key that the user wishes to authenticate (the target key), a key that the user trusts (the source key, e.g., her own), and a bound "b" on the length of paths to consider. The first metric returns a maximum set of node-disjoint paths of length at most "b" from the source key to the target key. The second metric returns an integer "k" and a set of paths of length at most b from the source to the target such that k nodes have to be removed (compromised) to break all the paths; the value of k returned is the maximum k for which such a set of paths exists, and is called the "connectivity" from the source key to the target key. If we insist that these metrics produce a numeric output, then in the case of disjoint paths it would be the number of disjoint paths that it returns, and in the other case it would be the connectivity.

The Reiter-Stubblebine model consists solely of a graph whose nodes represent keys and whose edges represents certificates available to the user evaluating the metric. In contrast to other metrics, the Reiter-Stubblebine metric makes no effort to take into account trust relationships or recommendations among entities; indeed, entities appear nowhere in its model (except named within the labels attached to edges, but the metric does not consider these). As such, when the metric returns a set of disjoint (or connective) paths, the user is left to determine whether the paths are "good enough" based upon who she trusts and the labels on the various edges in the paths. Even worse, since the metric does not take into account trust information, it may actually inhibit the user's decision on whether to adopt the recommended name-to-key binding, by including in its returned paths some nodes and edges that the user is unfamiliar with, at the expense of others that the user would have preferred. In summary. this model does not take into account as much information that is relevant to the authentication decision as possible.

The Reiter-Stubblebine metric also is susceptible to making decisions that could affect authentication, while hiding the fact from the user, even though it may be reached with ambiguous rules. The Reiter-Stubblebine metric, if interpreted as returning simply a number of disjoint paths, would have the problem of determining if two keys are adequately independent for the purposes of independent certification. In reality, the implementation of the Reiter-Stubblebine metric in PathServer returns the actual paths, leaving the determination problem for the user to figure out.

The Reiter-Stubblebine metric is also disadvantageous because it cannot be computed efficiently.
Zimmermann The metric attributed to Zimmermann uses the pretty good privacy (PGP) public key management systems. Zimmermann's graph resembles (but also preceded) the Reiter-Stubblebine graph. Its nodes are keys. and the edge $K_1 \rightarrow K_2$, labeled with attributes, represents a certificate that binds these attributes to $K_2$ and that can be verified with $K_1$. It differs from the Reiter-Stubblebine graph, however. in that the user augments each node with a trust value, which is one of unknown, entrusted, marginally trusted, or fully trust.

PGP computes the legitimacy of each node as follows. PGP first declares to be legitimate the node $K_o$ representing the user's key and any node K such that $K_o \rightarrow K$ is an edge in the graph. PGP then repeats the following until no more keys can be determined to be legitimate: if for some node K, either (i) there is an edge to K from a legitimate fully trusted node or (ii) there are edges to K with identical labels from two legitimate marginally trusted nodes, then K is declared legitimate. The numbers of edges required from fully trusted or marginally trusted nodes can be adjusted, but one and two are the defaults, respectively. In practice, determinations of node legitimacy are interwoven with assigning trust values to nodes. That is, a trust value is assigned to a node only after it has been determined to be legitimate and thus its owner is assumed to be known (i.e., named on the one edge to it from the fully trusted node or the two edges to it from the marginally trusted nodes). For the purposes of modeling, however, the end result is the same.

Intuitively, PGP might not be considered to implement a metric, but rather to simply determine whether a key is legitimate (authenticated) according to the policy described above. Alternatively, one might construct a metric from PGP by using multiple queries to PGP with different parameters to determine. e.g., the actual number of edges from legitimate marginally trusted nodes to a target node.

Zimmermann has several deficiencies that need to be examined. Zimmermann, like Reiter Stubblebine, is susceptible to making automated decisions on ambiguous information while keeping that decision hidden from the user. In PGP a user assigns a level of trust to each node (key), which is one of unknown, untrusted, marginally trusted, and fully trusted, based upon its apparent owner. By default, PGP will declare a key legitimate if it is certified by one fully trusted key or two marginally trusted keys. It is in this mechanism that PGP strays. It is often the case that a single user has two or more keys and uses each of these keys to certify another. An actual example is shown in Table 1 below. The first line describes a key-to-name binding, namely the binding between the key with identifier C7A966Dd and the name Philip R. Zimmermann <prz@acm.org>. The second and third lines shown that Jeffrey I. Schiller <jis@mit.edu> has signed this binding with two different keys, namely those identified with ODBF906D and 4DOC4EE1.

Now, if the user tells PGP and Jeffrey I. Schiller <jis@mit.edu> is marginally trusted introducer, then PGP will mark keys ODBF906D AND 4DOC4EE1 as marginally trusted, and therefore key C7A966DD will be declared legitimate (i.e., bound to Philip R. Zimmermann <prz@acm.org>). This occurs despite the fact that only one marginally trusted person was involved in certifying the key, whereas such a conclusion should supposedly require two.

This example points to a deeper problem than just an oversight in the PGP implementation. Rather, it points to the difficulty of determining if two keys are adequately independent for the purposes of independent certification, and we are aware of no foolproof way to automate this decision. For example, simply verifying that the names bound to ODBF906D and 4DOC4EE1 are different does not suffice, since they may have different email addresses but still indicate the same person, or since the key owners may not be the same but still act in a correlated way (e.g., two close friends). It is believed that this decision should not be hidden from the user. Appealing to the user impacts the case-of-use of the metric, however, as this decision can be unclear even for the user.

TABLE 1

PGP output showing signatures on key C7A966DD

| Type | bits/keyID | Date | User ID |
|---|---|---|---|
| pub | 1024/C7A966DD | 1993/05/21 | Philip R. Zimmermann <prz@acm.org> |
| sig | ODBF906D | | Jeffrey I. Schiller <jis@mit.edu> |
| sig | 4DOC4EE1 | | Jeffrey I. Schiller <jis@mit.edu> |

The Zimmermann metric is also disadvantageous in that while the metric admits a simple operational (i.e., algorithmic) description, the intuitive property that separates legitimate from illegitimate keys is undocumented and non-obvious.

Finally, it is debatable whether the Zimmerman metric is simple or difficult to utilize in a large-scale system. Although PGP is presently used as a standalone program, one may argue that the ease-of use of the metric has been achieved at the cost of hiding certain decisions from users that should not be hidden.

In view of the foregoing, it can be appreciated that a substantial need exists for a method and apparatus that combines the attractive features of each of the metric to be used in an authentication environment.

SUMMARY OF THE INVENTION

The disadvantages of the prior art are alleviated to a great extent by a method and apparatus that combines the features of each of the authentication metric to be used in an authentication environment. According to the present invention, a method for generating a certificate for use in authenticating a target is disclosed. The method includes the steps of obtaining a first key; assigning at least one attribute to the first key; assigning a liability value to the combination of the first key and at least one attribute; and signing a combination of the first key, the at least one attribute and the liability value with a second key.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

FIG. 5 is a block diagram of one embodiment of the present invention.

DETAILED DESCRIPTION

Overview

Figure 1:
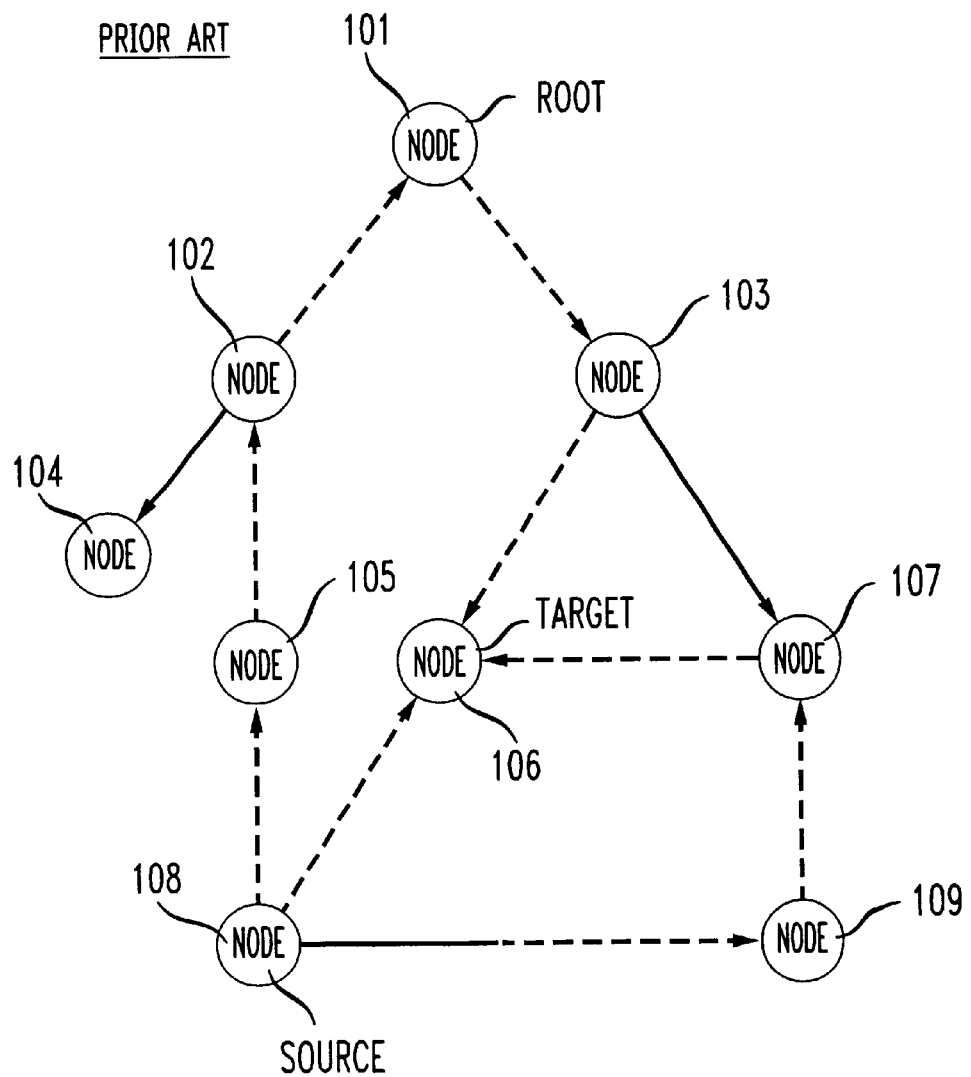
FIG. 1 illustrates an example of multiple paths from a trusted source key to a target key.
Figure 2:
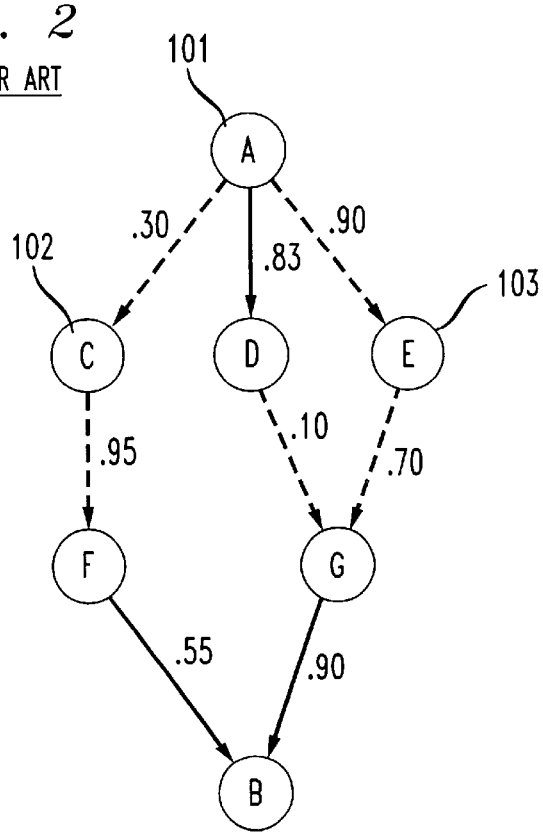
FIG. 2 is a graph of a Beth-Borcherding-Klein model.
Figure 3:
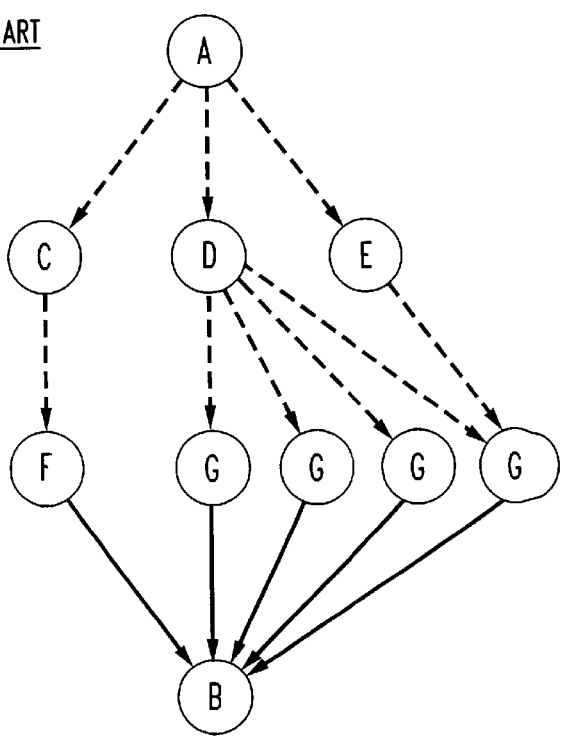
FIG. 3 is a graph of a manipulated Beth-Borcherding-Klein model.

The present invention is directed to an authentication system and method used to establish a name-to-key binding. Referring now in detail to the drawings wherein like parts are designated by like reference numerals throughout, there is illustrated in each of FIGS. 4A and 4B a diagram of the metric used in the present invention. The metric of the present invention is based on the concept of insurance for name-to-key bindings. The model on which the metric of the present invention will operate is a directed graph. As in the Zimmermann and Reiter-Stubblebine metrics, the nodes of this graph are public keys, and the edge $K_1 \rightarrow K_2$, for example, exists if a user is in possession of a certificate that assigns attributes (including an owner) to $K_2$ and whose signature can be verified using $K_1$. Each edge is labeled with the attributes included in the certificate that the edge represents.

Figure 4A:
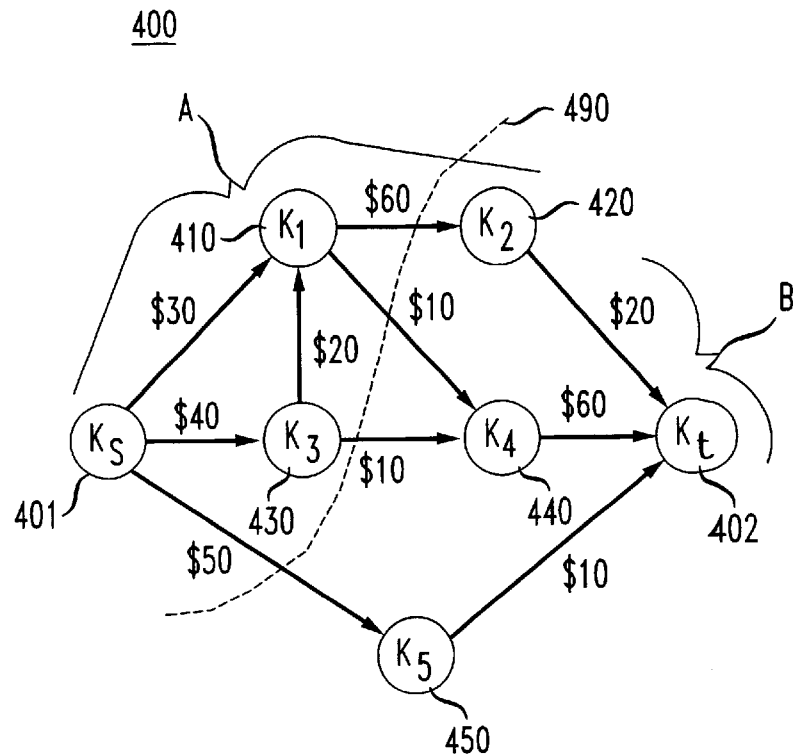
FIG. 4A is a graph showing a minimum capacity cut for the metric of the present invention.
Figure 4B:
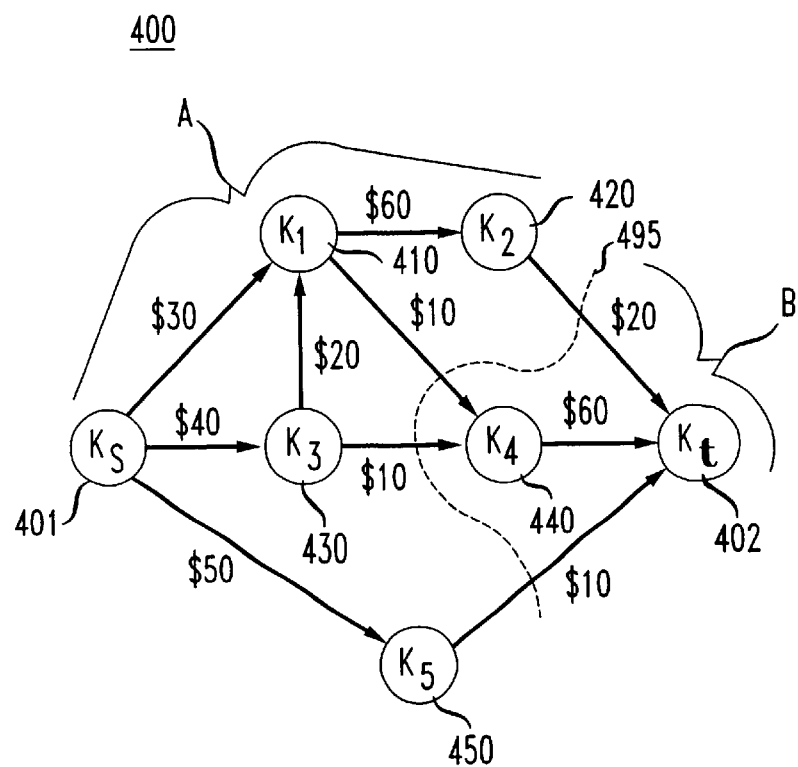
FIG. 4B is another graph showing a minimum capacity cut for the metric of the present invention.

Referring to FIGS. 4A and 4B, graph 400 includes a source key ($K_s$), 401, a target key ($K_t$), 402, and public keys $K_1 \rightarrow K_5$, labeled 410–450, respectively. Edges link two keys together to form a path. Graph 400 includes 10 edges connecting keys $K_s$, $K_t$, $K_1$, $K_2$, $K_3$, $K_4$, and $K_5$. As an example, the notation, $K_1 \rightarrow K_2$, will be used to represent the edge from key $K_1$ to key $K_2$ of the present invention. Using this notation, each edge $K_1 \rightarrow K_2$ is labeled with attributes included in the certificate that the edge represents. Additionally, each edge $K_1 \rightarrow K_2$ also has an indicator that identifies an amount of insurance that the owner of $K_1$ is willing to give regarding the attributes and behavior of $K_2$. For example, in one embodiment the indicator could be a numeric label that represents an amount of money for which the owner of $K_1$ is willing to be liable to the user if the attributes bound to $K_2$ in the certificate are incorrect, or if (the private key corresponding to) $K_2$ is compromised and used maliciously, then the owner of $K_1$ is liable for the stated amount. In effect, the owner of $K_1$ is indemnifying the user against losses incurred by a false authentication of $K_2$ based on a certificate it verified with $K_1$, or by the misbehavior of $K_2$. This form of insurance is called surety bonding.

The insurance label of the edge $K_1 \rightarrow K_2$ must be obtained from the owner of $K_1$ in some reliable way, and so it is natural for this value to be stored in the certificate that $K_1 \rightarrow K_2$ represents. It should be noted that it is not required for the user to determine the true owner (or other attributes) of $K_1$, or to determine that $K_1$ has not been compromised. Indeed, $K_1$ could have been compromised and used to forge the certificate $K_1 \rightarrow K_2$, including all its attributes and the insured value it contains. In this case, however, whoever certified $K_1$ would be liable, and this can regress along a path arbitrarily far. That is, on any path from a trusted source key to a target key (both specified by the user), if $K_1 \rightarrow K_2$ is the first liable edge in that path, i.e., the first edge on which the attributes are inaccurate or the certified key ($K_2$) misbehaves, then the owner of $K_1$ (specified by the key that certified $K_1$) is liable.

Obtaining a false name-to-key binding for the target key implies that every path from the source key to the target key must have some first liable edge. Once these edges are identified, the owners of the keys that created those edges can be held liable, each for the insured amount on the liable edge(s) that it created. It follows that a natural and prudent metric to compute would be the minimum insured amount of the name-to-key binding for the target key. That is, over all possible ways of choosing liable edges that intersect every path from the trusted source key to the target key the minimum amount of money that the user can expect to recover is determined.

This amount can be captured precisely using a tool from graph theory called a minimum capacity cut. $K_s$ denotes the trusted source key, $K_t$ denotes the target key, and for each edge $K \rightarrow K'$, the capacity of the edge, denoted by $c(K,K')$, is the insured amount of the edge. For nonexistent edges $K \rightarrow K'$, let $c(K,K')=0$. A $K_s$, $K_t$-cut (or just a cut, when $K_s$ and $K_t$ are understood) is a partition of the nodes of the graph into two sets A and B such that $K_s \in A$ and $K_t \in B$. The capacity of a $K_s K_t$-cut (A,B), denoted c(A,B), is simply the total capacity of the edges from A to B, i.e., $$c(A, B) = \sum_{K \in A, K' \in B} c(K, K')$$

Turning to the mapping in FIGS. 4A and 4B various cuts are possible. In FIG. 4A for example, one cut set A could consist of nodes $K_s$, $K_1$, and $K_3$ with set B consisting of nodes $K_2$, $K_4$, $K_5$ and $K_t$. Then using the equation above, the capacity for this cut would be $60+$10+$10+$50=$130 (the cut being shown by the dashed line 490).

A minimum capacity $K_1$, $K_t$-cut is then a cut with minimum capacity over all possible $K_1$, $K_t$-cuts. Note that any set of liable edges that intersects every path from $K_s$ to $K_t$ naturally induces a $K_s$, $K_t$-cut remove these liable edges from the graph, insert any nodes reachable from $K_s$ into A, and define B to be the complement of A. It follows that the capacity of a minimum capacity cut is a minimal amount for which the name-to-$K_t$ binding is insured. Alternatively, the minimum cut for FIG. 4B, shown as line 495 with set A including $K_s$, $K_1$, $K_2$, $K_3$ and $K_5$ and set B including $K_4$ and $K_t$, yields a $50 insurance ($20+$10+$10+$10) for the name-to-$K_t$ binding.

FIG. 5 of the present invention is a block diagram showing the steps for generating a certificate for use in authenticating a target for the present invention. In step 500, a first key is obtained. After a first key is obtained. it is assigned at least one attribute. The attribute can include, for example, the name of the owner of the key, the amount of cost of the key, etc. After, the attribute is assigned, a liability value is assigned to the combination of the first key and the attribute. The liability value assigned is an insurance amount for which the first key is liable with regard to the accuracy of the certification. It should be noted that while in the example above the certificate includes an actual insurance amount in monetary representation, the invention also includes those circumstances where the certificate includes an indicator of the insurance amount, e.g., an identification of an insurance policy type or a reference to where the particulars of the insurance policy can be found, rather than the specific liability amount. After the first key is obtained, assigned at least one attribute and a liability value. the combination of the first key. the at least one attribute and the liability value is signed by a second key.

Figure 6:
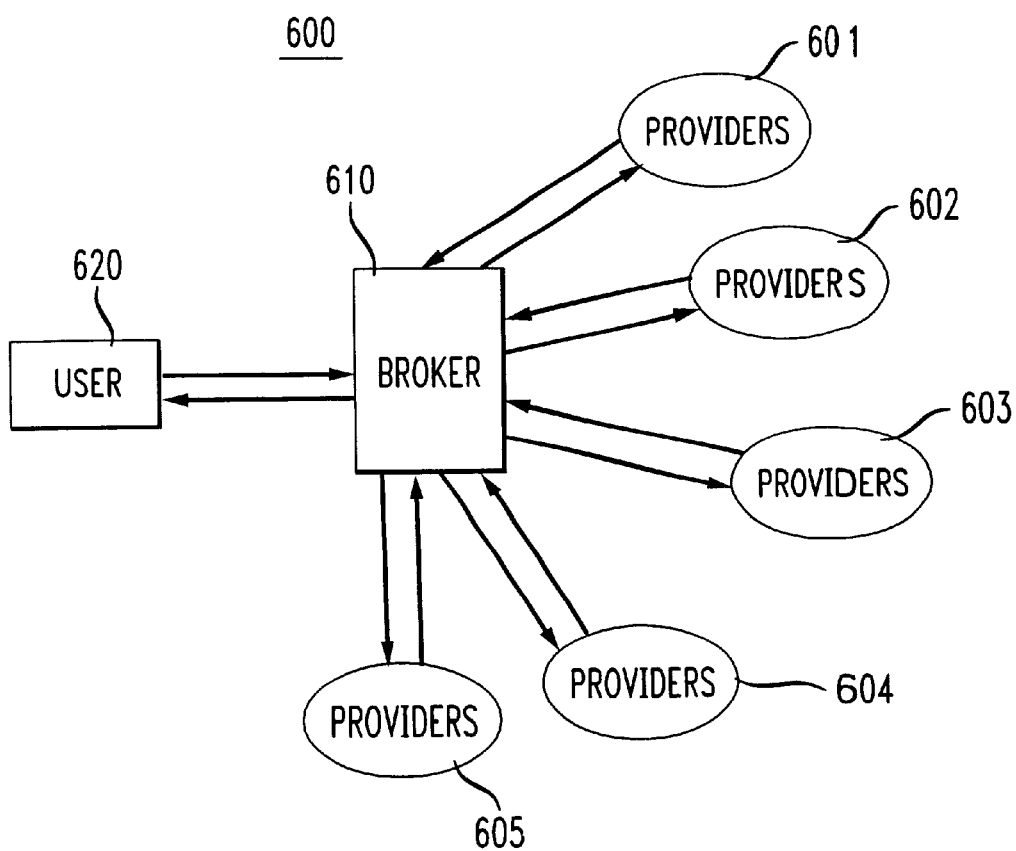
FIG. 6 is a diagram shown a certificate gather scheme utilizing the features of the present invention.

FIG. 6 is a diagram of a system for obtaining a name-to-key binding in accordance with the present invention. The system includes broker 610 in communication with various insurance providers 601–605. Referring to FIG. 6, a user 620 is connected to system 600 for establishing a name-to-key binding. In this diagram, the user needs to determine a name-to-key binding, and to obtain insurance for that binding which is suitable for his applications needs. The user communicates with broker 610 by any method of communication including by telephone, computer, etc. Broker 610 receives a query from user 620. The query requests that broker 610 supply user 620 with a quote or quotes from one or more of the insurance providers to establish a path to a target key. The request for a quote from user 610 would minimally include one or more trusted keys and a target key. It might also include a desired insured amount for the name-to-key binding. The user may send his request to various brokers until he receives a satisfactory quote.

In response to the query, the broker locates a set of relevant certification paths that offer the desired level of insurance for the query key. For example, the broker may forward an intelligent agent to one or more providers seeking information about insurance for a path for $K_s$ to $K_t$. The broker may receive information from one insurer as to a complete path from source key to target key. Other insurers may provide certificates relating to edges which when combined with edges for other insurers could provide the desired path. Using the certification analysis process of the present invention, the broker can quote a price to the user for these paths identifying available insurance level(s). The quote would account for a range of factors typically relevant in insurance pricing, including risk associated with the package of paths and the volume of insurance business.

Further, user 620 could communicate with a plurality of brokers or directly with the insurance providers. Moreover, broker 610 could be a distributor, a retailer or combination or both. A distributor purchases certificates from possible multiple insurance providers, and acts as a middle man in providing set of certificates to retailers or possibly users directly. A retailer purchases edges from the distributor or insurance providers and packages them for the users. By packaging, the retailer sells to a user a set of certificates that meets the user's needs. These certificates might form paths from a key that the user trusts to a key that the user wants to authenticate.

Underlying Principles and How the Proposed Metric Fares Against Those Principles In reviewing the known metrics it was determined that the user would be better served if the metric observed a number of principles that enhance the level of assurance that the user receives. These principles identified are as follows.

Principle 1: Creating the model to which a metric is applied should not require the user to infer bindings between keys and their owners. In particular, when representing certificates in a model: Entities don't sign certificates, keys do.

As one would expect, ambiguous semantics of a model's parameters can generally lead to different metric values depending on one's interpretation of the parameters. Such discrepancies in interpretations must be resolved before the output of a metric can be meaningful, especially if one entity relies on numbers from another entity with a different interpretation. Principle 2 addresses this issue.

Principle 2: The meaning of the model's parameters should be unambiguous. This especially applies to the meaning of probabilities and trust values in models that use them.

The information that is relevant to the authentication decision can be application-dependent. As described below, Principle 3 is desired because if a metric produces an output based on limited information, there generally will be a greater effort required to interpret whether the authentication is "good enough".

Principle 3: A metric should take into account as much information as possible that is relevant to the authentication decision that the user is trying to make As described below, Principle 4 is in some sense the dual of Principle 3. Principle 3 states that a metric should take as much relevant information into account as possible, whereas Principle 4 cautions against the metric doing too much with it.

Principle 4: A metric should consult the user of any authentication-relevant decision that cannot be accurately automated. A decision that could affect authentication should be hidden from the user only if it can be reached using unambiguous, well-documented, and intuitive rules.

In order for a user to determine what metric value is "good enough" for her application, she must have an intuitive feel for what the metric output means in a practical sense. Principle 5 reflects this idea.

Principle 5: The output of a metric should be intuitive. It should be possible to write down a straightforward natural language sentence describing what the output means.

The sensitivity of metrics to misbehaver of entities will now be explained. The type of "misbehavior" focused on is deceit by one or more entities represented in the model (or that supply input to the model) in which the metric is applied, in an effort to manipulate the output of the metric to increase the user's confidence in the authentication. If an attacker is able to inflate the metric output to the point that the application accepts the authentication, then the metric is not serving its purpose. Principle 6, below, expresses this idea Principle 6: A metric should be designed to be resilient to manipulations of its model by misbehaving entities. and its sensitivity to various forms of misbehavior should be made explicit.

The last area examined is the effectiveness of the metric. Principles 7 and 8 evaluate the effectiveness of the metric. The practical effectiveness of the metric is defined as the characteristics of a metric that make it simple or difficult to utilize in a large-scale system. This idea is reflected in Principle 7.

Principle 7: A metric should be able to be computed efficiently.

This effectiveness section concludes with a principle concerning the output of the metric in the face of partial information.

Principle 8: A metric's output on partial information should be meaningful.

A metric is meaningful on partial information if it allows some conclusion to be drawn about what the metric output would be on full information. The motivation for this principle is as follows: in a large-scale system, it may be difficult or even impossible to gather all certificates that have been created. As a result, metrics will almost certainly be applied only to a subset of the certificates that actually exist at that time, and indeed some of these certificates may have been revoked. Principle 8 simply says that the metric's output should have some relevance even when computed on this partial information. For example, if a metric's output on partial information makes it possible to determine a useful lower bound on the metric's output on full information, this would go a long way toward meeting this principle.

With respect to the principles, the present invention obeys each of the principles for establishing name-to-key binding.

Principle 1: The user is not required to ascertain name-to-key bindings to construct the model for new metric, as described above.

Principle 2: The notion of insurance employed in the present invention is well-defined in business and legal culture and, we expect, can be extended naturally for this application. The extensions described above to allow the user to specify trust in entities to pay is also grounded in well-established business practice: for example, Dun & Bradstreet Corporation (see www.dbisna.com) provides industry-standard reports that rate the solvency and payment history of organizations using a well-defined rating system.

Principle 3: The present invention enables a user to weigh her financial risk associated with each transaction against the amount she can expect to recover if a name-to-key binding relied upon for the transaction is false. This information is adequate for a user to determine, for most business applications, whether the assurance in the name-to-key binding is sufficient.

Principle 4: The output of the metric of the present invention is intuitive and natural: it is simply an amount for which the name-to-target key binding is insured.

Principle 5: The metric of the present invention computes an insured value for the name-to-target key binding that the user can safely expect to recover if misled, regardless of what entities misbehave or what keys are compromised (other than the trusted source key). In particular, the metric's output is always bounded from above by the capacity of the cut $(\{K_s\}, V\backslash\{K_t\})$, where V is the net of all nodes. So, the level of insurance offered by the trusted source node prevents malicious entities from increasing the metric output above that level.

Principle 6: The present invention allows one to identify any decisions within this metric that could affect authentication and that are wrongfully hidden from the user. In particular, the metric incorporates no determinations of key or entity independence for the purposes of authentication, which is the point on which the PGP metric stumbled. The primary decision (or more accurately, assumption) made within this metric is that the creator of the first liable edge on any path from the trusted source key to the target key will pay the amount for which it insured that edge. However, as already described. this decision can be left to the user, by allowing the user to designate her trust in nodes to pay based on standard business reports.

Principle 7: The capacity of a minimum capacity cut in accordance with the present invention can be computed using any maximum flow algorithm, of where there are many efficient examples.

Principle 8: On partial information the metric of the present invention returns a meaningful result: an amount for which the name-to-key binding is insured (though it might be insured for more). If an entity's responsibility for a certificate that it creates extends beyond any premature revocation of that certificate, then even unknown certificate revocations pose no threat to the insured value of a name-to-key binding. Otherwise, computing a minimum capacity cut with every edge capacity set to one outputs the number of certificates that would need to be revoked to leave the binding uninsured.

The metric of the present invention can be advantageous in part because its outputs can have direct relevance for a range of business transactions, and in part because it places responsibility on each certifier to assess and assume risk for the certificates it creates.

To summarize, the metric of the present invention takes a graph, a trusted source key $K_s$ and a target key $K_t$ as input, and returns an amount for which the name-to-key binding is insured. The certificate for a given edge in the present invention includes the key for the destination node, one or more attributes about that key, such as its owner, an insurance indicator and the combination is signed by another key and that another key is associated with the insurer. The system can compute the capacity of a minimum capacity $K_s$, $K_t$-cut to provide a user with further assurance information about the authentication paths. Extensions of this metric could refine this computation based on trust. For example, the model could allow the user to limit the nodes that the metric includes in its computation, based on her trust in their apparent owners (specified by the edges that certify them) to pay if held liable.

What is claimed is:

1. A method for determining a minimum assurance of a name-to-key binding for a target key, the method comprising the steps of:
   a) identifying a plurality of paths from a source key to the target key, each path including at least one edge and at least two nodes;
   b) dividing the nodes into a first set and a second set wherein said source key is associated with said first set and said target key is associated with said second set;
   c) evaluating edges between said first and said second set to determine a cut insurance amount;
   d) repeating steps b) and c) such that at least one node is moved between the first and second sets and until a minimum cut insurance amount is determined; and
   e) providing the determined minimum cut insurance amount.

2. A method for determining a minimum assurance of a name to key binding for a target key, the method comprising the steps of:
   a) identifying a plurality of paths from a source key to the target key, each path including a plurality of nodes;
   b) analyzing a certificate from every node intermediate to said source key and said target key, said step of analyzing including the step of determining an insurance indicator contained in the certificates of the respective nodes;
   c) calculating a minimum assurance using the determined insurance indicators; and
   d) providing the calculated minimum assurance.

3. The method of claim 2 wherein said step of calculating the minimum assurance comprises the substeps of:
   i) dividing the nodes into a first set and a second set, wherein said source key is in said first set and said target key is in said second set;
   ii) evaluating edges between said first set and said second set to determine a cut insurance amount;
   iii) dividing the nodes into another pair of sets, each set in said another pair of sets differing from any previously created sets of the nodes;
   iv) evaluating edges between said another pair of sets to determine a cut insurance amount; and
   v) repeating steps iii) and iv) until a minimum cut insurance amount is determined.

4. The method of claim 3 wherein said steps of evaluating edges includes examining an insurance indicator contained in certificates associated with the edges.

* * * * *